UNITED STATES PATENT OFFICE.

LEOPOLD KAHL, OF SCHWIENTOCHLOWITZ, GERMANY, ASSIGNOR TO RUDOLF RUETGERS, OF CHARLOTTENBURG, GERMANY.

OXALIC-ACID ESTER OF PARACRESOL AND PROCESS OF MAKING SAME.

SPECIFICATION forming part of Letters Patent No. 711,572, dated October 21, 1902.

Application filed January 27, 1902. Serial No. 91,509. (No specimens.)

*To all whom it may concern:*

Be it known that I, LEOPOLD KAHL, manufacturing chemist, a subject of the German Emperor, residing at Schwientochlowitz, Prussia, Germany, have invented a new and useful Oxalic-Acid Ester of Paracresol and Process of Making Same, of which the following is a specification.

Coal-tar, and consequently also the mixture of crude phenols obtained from it, contains, as is well known, the three isomeric cresols—ortho, meta, and para cresol—the xylenols, and similar substances in addition to the phenol. The phenol and orthocresol may be recovered from this mixture by repeated fractional distillation; but hitherto it has not been found possible to separate by simple fractionation the para and meta cresol, both boiling at 200° centigrade. In view of the increasing commercial importance of the pure meta and para cresol for the manufacture of trinitrometacresol, pure cresotinic acids, and for other purposes it is desirable, however, to possess a simple method of separating or obtaining the two cresols in a pure condition.

The present invention is based on the discovery that under certain conditions the paracresol will yield an oxalic-acid ester, while under the same conditions the metacresol takes little or no part in the formation of esters, and also on the fact that oxalic-acid esters of paracresol are insoluble in the cooled mixture.

The details of procedure are as follows: An anhydrous cresol mixture, such as may be obtained in commerce, is brought to the temperature of the water-bath, about one-tenth of its weight of dehydrated oxalic acid is stirred into the mixture, and the heating is continued until the whole of the oxalic acid has entered into solution. Instead of oxalic acid the corresponding quantity of dehydrated acid oxalate (such as bioxalate or tetraoxalate) may be used, in which case the heating is continued until the acid oxalate has been decomposed by the paracresol and neutral oxalate has thereby been precipitated, which is subsequently separated from the solution by hot filtration. The solution is then allowed to cool, and thereby the oxalic-acid ester of the paracresol caused to crystallize out. The ester thus obtained is filtered and pressed, then washed with benzene or other suitable solvents in order to remove the last traces of the cresol adhering to it, and finally decomposed with water.

The paracresol oxalic-acid ester obtained as described or from pure paracresol by means of dehydrated oxalic acid or acid oxalate is a colorless body which resists atmospheric influences fairly well and on sublimation yields fine scales or leaflets. It enters readily into chemical reaction, is very easily soluble in alcohol, ether, and glacial acetic acid, but not soluble in benzene. When heated with benzene, it undergoes a partial decomposition of its components while yielding paracresol to benzene. This takes place, because the ester always contains small quantities of water, which water during the process of heating causes a partial saponification. The presence of water is also an obstacle to the analysis of the ester, the composition of which may be most easily determined by decomposing a considerable quantity of the freshly-compared ester into its components and weighing the latter separately. According to such an analysis the composition of the acid ester is represented by the formula

Owing to its contents of water, as mentioned above, the melting-point of the ester is also not sharply defined. When heated in small tubes, such as are commonly used for ascertaining melting-points, the ester commences to change at 90° centigrade, and at 99° it contracts to a translucent mass. If the heating is continued to about 185° to 186°—that is to say, the neighborhood of the melting-point of the anhydrous oxalic acid—the turbid matter, probably consisting of oxalic acid, melts completely while giving off gas.

As mentioned above, the ester is easily saponified by water while reconstituting the paracresol and the oxalic acid. Owing to the appreciable solubility of the paracresol in concentrated solution of oxalic acid, this saponification of the paracresol ester is preferably accompanied with the addition of benzene in order to facilitate the removal of the separated paracresol from the solution of oxalic acid. From the mixture of benzene and paracresol, which separates out over the oxalic-acid solution, the paracresol may be removed most easily by distilling off the benzene.

Instead of decomposing the ester with water steam may be used for this purpose, and the paracresol which has separated out may be driven out with steam. The oxalic-acid solution obtained in either case is concentrated by evaporation, and the oxalic acid deposited by this operation is again used after being relieved of water.

The relative quantities of oxalic acid or oxalate and cresol mixture may be varied; but those mentioned above have been found especially useful. The temperature at which the reaction is performed may also vary within wide limits, provided that it does not exceed the temperature of decomposition of the oxalic acid. Supposing, for instance, that the raw material is a cresol mixture which has been relieved as far as possible of phenol, orthocresol, and the xylenols by distillation and which contains forty per cent. of paracresol and sixty per cent. of metacresol, it cannot be relieved of the whole of its paracresol by a single operation according to the above process, because the quantity of oxalic acid that can be used at one time for the production of esters is limited by the solubility of the oxalic-acid ester of paracresol in the cresol mixture and depends also on the quantity of water produced during the formation of esters. This quantity should not exceed a certain limit; otherwise it will not combine with the excess of cresol (which during the reaction serves to abstract water) sufficiently for avoiding the saponifying effect on the newly-formed ester. If, however, the water produced by the reaction is distilled off in a vacuum during the production of the ester, the said restriction is avoided, and a greater quantity of oxalic acid may be used at one time. The poorer cresol mixture produced by filtering and pressing the ester is completely relieved of water by heating or redistillation and is again treated with oxalic acid in the manner described above. This process is repeated until the whole quantity of paracresol has been separated. The metacresol will be found in the residue. If the esterification of the paracresol contained in the cresol mixture is effected by means of acid oxalate, it is not necessary to distil off the water of reaction in a vacuum, because the simultaneously-formed neutral oxalates are strongly hygroscopic when in a nascent state and absorb the water of crystallization while forming aqueous salts, which separate out in the shape of crystals. The esterification of the paracresol may be performed on a crude cresol mixture still containing orthocresol and xylenol. In this case the metacresol may be subsequently recovered by repeated fractional distillation of the cresol mixture relieved of paracresol.

What I claim is—

1. The process for the separation of paracresol from a commercial mixture containing para and meta cresol, which consists in adding to the hot mixture sufficient anhydrous oxalic acid to transform the paracresol into an oxalic-acid ester, allowing the said ester to crystallize out of the solution, and separating it mechanically from the supernatant liquid, substantially as described.

2. The process for the separation of paracresol from a commercial mixture of para and meta cresol which consists in converting the paracresol into an oxalic-acid ester by the addition of anhydrous oxalic acid to the hot mixture of cresols, allowing the said ester to crystallize out of the mixture, separating the said ester from the supernatant liquid, and then decomposing it by means of water, substantially as described.

3. As a new product of manufacture, oxalic-acid ester of paracresol obtainable from paracresol and oxalic acid, and constituting a colorless solid, which is easily soluble in alcohol, ether and glacial acetic acid, insoluble in benzene, and capable of sublimation in the shape of scales and leaflets, substantially as described.

In testimony that I claim the foregoing as my invention I have signed my name in presence of two subscribing witnesses.

LEOPOLD KAHL.

Witnesses:
FRIEDRICH RUSSIG,
JOSEF SCHOTZ.